H. ZIELINSKI.
MOTOR VEHICLE.
APPLICATION FILED DEC. 17, 1910.
1,072,557.
Patented Sept. 9, 1913.
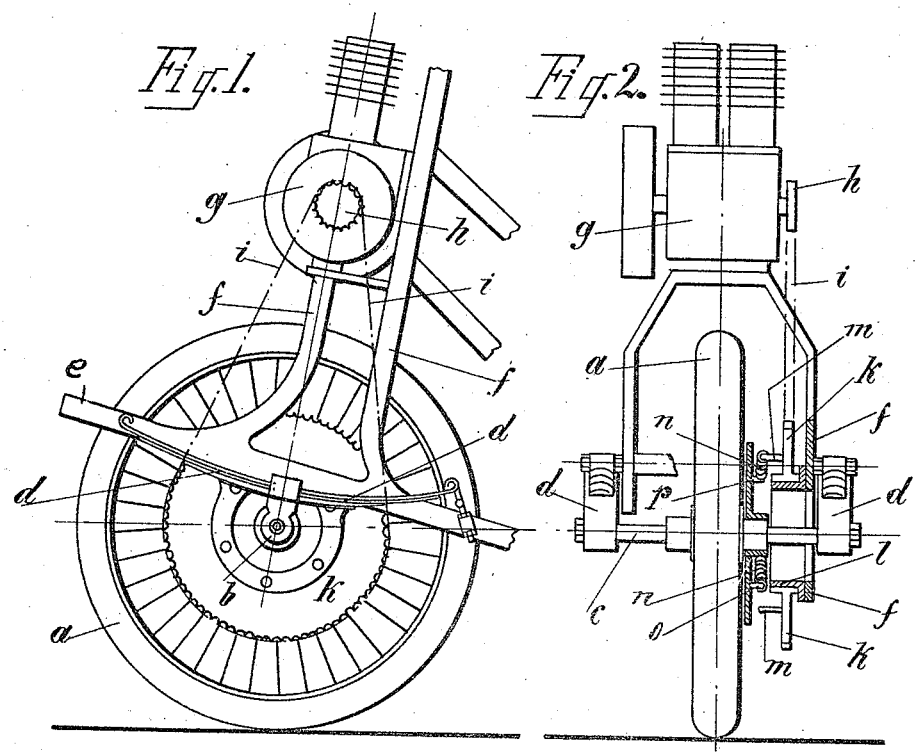
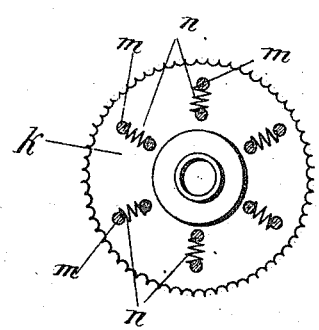
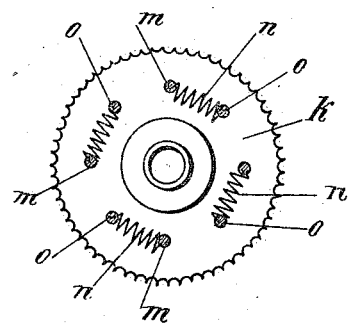
Witnesses:
Carl L. Choate
Horace A. Crossman
Inventor:
Hieronymus Zielinski,
by Emery, Booth, Janney & Varney
Attys.

UNITED STATES PATENT OFFICE.

HIERONYMUS ZIELINSKI, OF BERLIN, GERMANY.

MOTOR-VEHICLE.

1,072,557.

Specification of Letters Patent.  Patented Sept. 9, 1913.

Application filed December 17, 1910. Serial No. 597,748.

*To all whom it may concern:*

Be it known that I, HIERONYMUS ZIELINSKI, a subject of the Emperor of Germany, residing at Frankfurter Atlee 15, Berlin, Germany, have invented Improvements in or Relating to Motor-Vehicles, of which the following is a specification.

This invention has for its object to provide an improved driving arrangement for transmitting power from the motor to the spring-mounted driving wheel of a motor vehicle, more particularly a motor tricycle.

In the majority of motor vehicles there is no difficulty in suitably driving a spring mounted driving wheel, the power transmitting mechanism being arranged horizontally and at right angles to the direction of action of the driving wheel springs. The conditions are however far more difficult when the driving mechanism has to act almost vertically, as is usually the case in a motor tricycle, in which the motor is arranged over the driving front wheel.

Now according to this invention the power is transmitted from the motor to the driving wheel axle through chain gear the wheels or sprockets of which are arranged at a definite and unvarying distance apart. The driving wheel and its hub are also rigidly connected to the axle of the wheel. The elastic or spring action is obtained by the axle itself being arranged to work up and down in a relatively large slot or slots in the carrying fork and being mounted on two laminated springs, one on each side of the fork. The power is transmitted through an elastically acting mechanism connected at one end to the hub and at the other end to the driven toothed wheel of the chain drive. This spring or elastic mechanism serves a double object; in the first place it allows the play of the axle and driving wheel relatively to the chain wheel, and secondly the interposition thereof enables the vehicle to be started in a manner entirely free from shock or jerk and the inequalities in the drive of the motor to be compensated or neutralized. This is of very great importance inasmuch as it obviates all jerking of the chain resulting from the chain having to take up all the shocks and jerks caused through the uniform speed of the vehicle owing to the momentum of the moving parts on one hand and the non-uniform or uneven action of the motive power on the other. In this way the improved driving arrangement insures a smooth transmission of power without any jerking of the chain, combined with a spring or elastic action of the front or driving wheel.

One construction of the improved driving arrangement is shown in the accompanying drawings.

Figure 1 is a side elevation, Fig. 2 a view partly in front elevation and partly in section through the driving mechanism. Figs. 3 and 4 show the power-transmitting device in its position of rest and in the position it assumes while driving.

The front or driving wheel $a$ is fixed on the axle $c$ by means of the hub $b$. The axle $c$ is supported by two laminated springs $d$ carried by a longitudinal extension $e$ of the front wheel fork $f$. The transmission of power from the motor $g$ is effected through a chain wheel $h$ on the motor shaft, a driving chain $i$ and a chain wheel $k$ mounted to rotate on a ring $l$ fixed in the front fork $f$. Within the ring $l$ the lower part of the wheel fork $f$ is formed with a slot or hole in size corresponding to the amount of play required by the elastic movement of the laminated springs $d$. The wheel $k$ is furnished with lateral projections $m$ connected by springs $n$ to pins or projections $o$ on a disk $p$ which is fixed in the driving wheel hub $b$. Any desired number of springs $n$ can be employed, in Fig. 3, six are shown, in Fig. 4 only four.

By means of the improved driving arrangement the transmission of power can be effected through a chain drive the sprocket wheels of which do not move relatively except in a rotary sense, the elastic action of the driving wheel taking place through a laminated spring and the power transmitted through separate elastically-acting or spring elements that follow the elastic movement of the axle.

What I claim is:—

1. In a motor vehicle the combination of a vehicle frame member, a driven wheel mounted on said frame, a driving wheel, an axle secured thereto, springs carried by said axle and having bearings thereon, said frame and driven wheel suspended by said springs substantially concentrically about and at a distance from said axle, permitting free play thereof relative to said frame at all times and a plurality of driving wheel propelling springs radially disposed on and connecting said driven and driving wheels.

2. A motor vehicle comprising in combination a driving wheel, a disk thereon secured thereto, an axle secured thereto, a spring mounted on said axle, a vehicle frame provided with an axle receiving ring, said ring carried and positioned by said spring substantially centrally about and removed from said axle and permitting free play thereof within said ring in any direction at will, a driven wheel rotatably mounted on said ring, a plurality of springs connected respectively with said driven and driving wheels, and a motor on said frame connected with said driven wheel.

3. A motor-vehicle comprising, in combination, a forked frame provided with a curved axle bearing receiving area, an axle, a wheel fixed thereto, a cushioned bearing for the axle carried by said frame in said area permitting gyratory movement of the wheel relative to the vehicle frame, and a driven wheel mounted to rotate about said area, and resilient driving means between said driven wheel and axle.

Signed at Berlin this 29th day of November 1910.

HIERONYMUS ZIELINSKI.

Witnesses:
 WOLDEMAR HAUPT,
 HENRY HASPER.